(12) United States Patent
Marchand et al.

(10) Patent No.: US 7,514,904 B2
(45) Date of Patent: Apr. 7, 2009

(54) SYSTEM AND METHOD FOR DETERMINING BATTERY TEMPERATURE

(75) Inventors: David Gregory Marchand, Dunlap, IL (US); John F. Szentes, Peoria, IL (US); David C. Orr, Dunlap, IL (US); John J. Bernardi, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 422 days.

(21) Appl. No.: 11/314,292

(22) Filed: Dec. 20, 2005

(65) Prior Publication Data

US 2007/0139017 A1    Jun. 21, 2007

(51) Int. Cl.
*H01M 10/46* (2006.01)
(52) U.S. Cl. ...................................... 320/150
(58) Field of Classification Search ................ 320/104, 320/150
See application file for complete search history.

(56) References Cited

U.S. PATENT DOCUMENTS

| 4,342,963 | A | 8/1982 | Karnowski et al. |
| 6,076,964 | A | 6/2000 | Wu et al. |
| 6,902,319 | B2 * | 6/2005 | Wu et al. ...................... 374/141 |
| 2004/0004464 | A1 * | 1/2004 | Tsukamoto et al. ......... 320/162 |
| 2004/0155661 | A1 | 8/2004 | Field et al. |
| 2005/0074048 | A1 | 4/2005 | Wu et al. |

FOREIGN PATENT DOCUMENTS

| DE | 102 08 651 | 1/2003 |
| EP | 1688722 | 8/2006 |

* cited by examiner

*Primary Examiner*—Edward Tso
(74) *Attorney, Agent, or Firm*—Finnegan, Henderson, Farabow, Garrett & Dunner

(57) ABSTRACT

A system for approximating a temperature of a battery includes a sensor configured to provide a temperature measurement of the ambient air, a sensor configured to provide a voltage measurement of the battery, a sensor configured to provide a current measurement of the battery, and signal processing circuitry configured to determine an approximate battery temperature as a function of the measured ambient air temperature, the measured voltage of the battery, and the measured current of the battery.

36 Claims, 5 Drawing Sheets

US 7,514,904 B2

SYSTEM AND METHOD FOR DETERMINING BATTERY TEMPERATURE

TECHNICAL FIELD

The present disclosure is directed to a system and method for determining battery temperature, and more particularly, to a system and method for determining a temperature of a battery of a vehicle or work machine.

BACKGROUND

A typical vehicle or work machine includes a battery that provides power to the internal combustion engine and the onboard electrical systems of the vehicle or work machine. Because the battery is constantly providing power to both the electrical systems and engine, the battery charge is constantly being drained. Thus its voltage output constantly drops. However, when the engine is running, a battery charging system (i.e. alternator or other power electronics) recharges the battery such that the battery charge is high enough for continued power output, and will remain high enough to start the engine on the following startup attempt.

Battery temperature is an important parameter for controlling battery charging or discharging processes. Knowledge of the battery temperature will enable the processes ability to prevent the battery from overheating at high temperatures during charging or discharging, and also prevent the battery from being overcharged at low battery temperatures during charging.

Conventionally, a battery temperature sensor is mounted outside of the battery, usually under the battery tray upon which the battery is mounted, for measuring the battery temperature. Because the temperature sensor is mounted outside of the battery, the temperature measurement is affected by the surrounding environment, and therefore does not accurately reflect the dynamic variations of the battery's internal temperature. The inability to accurately determine a battery's internal temperature adversely affects the battery charging and discharging strategies.

Implementing an externally mounted temperature sensor in the system is detrimental to the system effectiveness because of the inability of the sensor to accurately determine a battery's internal temperature and a significant addition of cost due to the sensor. The cost addition results from the sensor device hardware and the installation labor to the vehicle or work machine. It is impractical to incorporate a temperature sensor within the battery itself because of the costs involved, the design requirements of the battery, and the fact that the battery is often replaced by a user. Therefore, it would be beneficial to provide a more reliable, more accurate and cost effective technique for approximating the battery temperature.

One method of determining a vehicle battery temperature without installing a battery temperature sensor is described in U.S. Pat. No. 6,076,964 (the '964 patent) issued to Wu et al. The '964 patent describes a model for determining a battery temperature by using several physical measurements on the vehicle. However, the system of the '964 patent only measures the heat transfer from an engine to the battery due to the mechanical attribute of the engine to the battery, and neglects the heat generated in the battery due to the chemical reactions that take place during charging and discharging of the battery. Therefore, it fails to provide an accurate approximation of the internal temperature of the battery.

The system of the present disclosure solves one or more of the problems set forth above.

SUMMARY

In one aspect, the present disclosure is directed to a system for approximating the temperature of a battery. The system includes a sensor configured to provide a temperature measurement of the ambient air, a sensor configured to provide a voltage measurement of the battery, a sensor configured to provide a current flow measurement of the battery, and signal processing circuitry configured to determine an approximate battery temperature as a function of the measured ambient air temperature, the measured voltage of the battery, and the measured current flow through the battery.

In another aspect, the present disclosure is directed to a method of approximating the temperature of a battery. The method includes approximating an initial temperature of the battery, approximating heat generated inside the battery, and approximating the temperature of the battery based on the initial temperature of the battery and the heat generated inside the battery.

DETAILED DESCRIPTION

Figure 1:
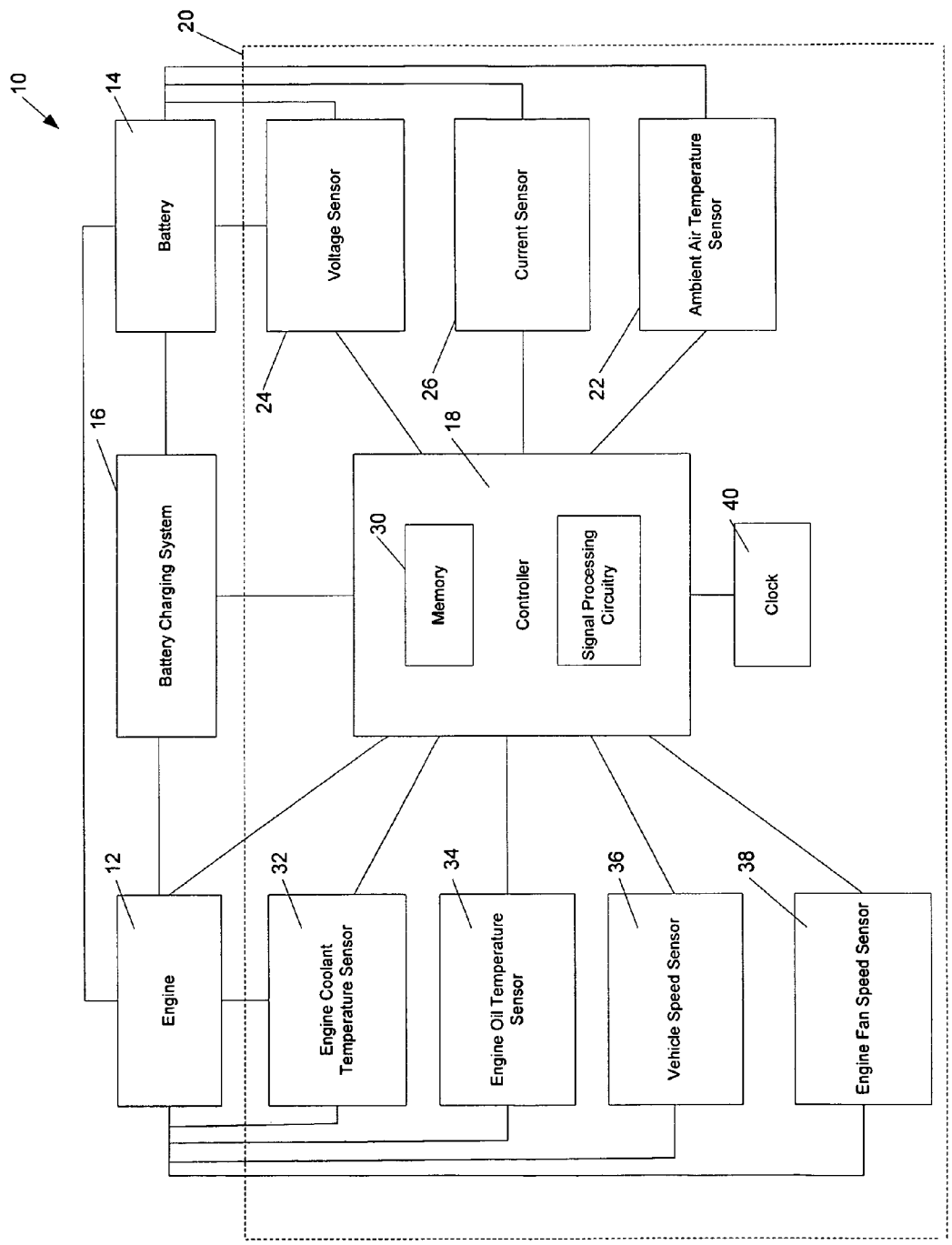
FIG. 1 is a schematic illustration of an exemplary disclosed system for approximating the temperature of a battery.

FIG. 1 illustrates an engine system 10 of a machine, such as a vehicle or a work machine. As shown in FIG. 1, the engine system 10 includes an engine 12, a battery 14 coupled to the engine 12, a battery charging system 16 coupled to the battery 14, and a controller 18 connected to the engine 12 and the battery charging system 16. The engine may be any type of conventional engine, for example, an internal combustion engine and the battery may be any type of conventional battery, for example, a lead-acid battery. The battery 14 provides electrical power to the engine 12 and other electrical systems in the machine. The battery charging system 16 may recharge the battery 14 when the engine 12 is running. The controller 18 controls the engine 12 and the battery charging system 16. The engine system 10 further includes a battery management system 20 coupled to the engine 12, the battery 14, and the battery charging system 16. The battery management system 20 may include an ambient air temperature sensor 22 configured to provide a temperature measurement of the ambient air, a voltage sensor 24 coupled to the battery 14 and configured to provide a voltage measurement of the battery 14, and a current sensor 26 coupled to the battery 14 and configured to provide a measurement of the current flow through the battery 14. The battery management system 20 further includes signal processing circuitry, which, in one embodiment as shown in FIG. 1, may be integrated with the controller 18 (the signal processing circuitry will be hereinafter referred to as the controller 18). The controller 18 is coupled to the ambient air temperature sensor 22, the voltage sensor 24, and the current sensor 26. The controller 18 is configured to determine an approximate battery temperature as a function of the ambient air temperature measured by the ambient air temperature sensor 22, the voltage measured by the voltage sensor 24, and the current measured by the current sensor 26. In one embodiment, the controller 18 is responsive to the outputs from the voltage sensor 24 and the current sensor 26, and configured to determine heat generated over time inside the battery 14 based on the voltage of and current through the battery 14. The controller 18 is also responsive to the ambient air temperature sensor 22, and configured to approximate an initial temperature of the battery 14. The controller 18 may be configured to determine the approximate battery temperature based on the initial battery temperature and the heat generated in the battery 14. The controller 18 is further configured to control charging, discharging, and cooling the battery 14 in response to the approximate temperature of the battery 14. In one embodiment, the controller 18 may further include a memory 30 configured to store data, for example, the temperature of the battery 14.

In another embodiment, the memory 30 may store data of resistance of the battery 14 corresponding to temperature of the battery 14. For example, the memory 30 may store a look-up table or a graph of resistance of the battery versus temperature of the battery. The controller 18 may be configured to determine the heat generated inside the battery based on the resistance obtained from the resistance profile database and the current through the battery 14, instead of using the voltage of and the current through the battery 14.

The battery management system 20 may further include a clock 40 coupled to the controller 18 and configured to indicate times of events of the engine system 10, for example, the time when the engine system 10 is turned off, and the time when the engine system 10 is turned on. The clock 40 is further configured to indicate times of the events of the battery 14. The events include but are not limited to the starts of charging or discharging of the battery 14, and the end of a previous battery temperature determination. The memory 30 is further configured to store those times of the events. The battery management system 20 may further include an engine coolant temperature sensor 32, an engine oil temperature sensor 34, a vehicle speed sensor 36, and a cooling fan speed sensor 38. The controller 18 is coupled to the engine coolant temperature sensor 32, the engine oil temperature sensor 34, the vehicle speed sensor 36, and the cooling fan speed sensor 38. The controller 18 is further configured to receive an engine coolant temperature signal, an engine oil temperature signal, a vehicle speed signal, and a cooling fan speed signal from the sensors and determine the approximate temperature of the battery 14 further in response to those signals.

INDUSTRIAL APPLICABILITY

The disclosed system for approximating a battery temperature may be implemented in any machine such as a vehicle or work machine including trucks, construction equipment machines, etc. By implementing the disclosed system, a more accurate battery temperature can be determined using the existing sensors in the machine, without the need for additional dedicated sensors. The operation of the system for approximating the temperature of the battery will now be explained.

Figure 2:
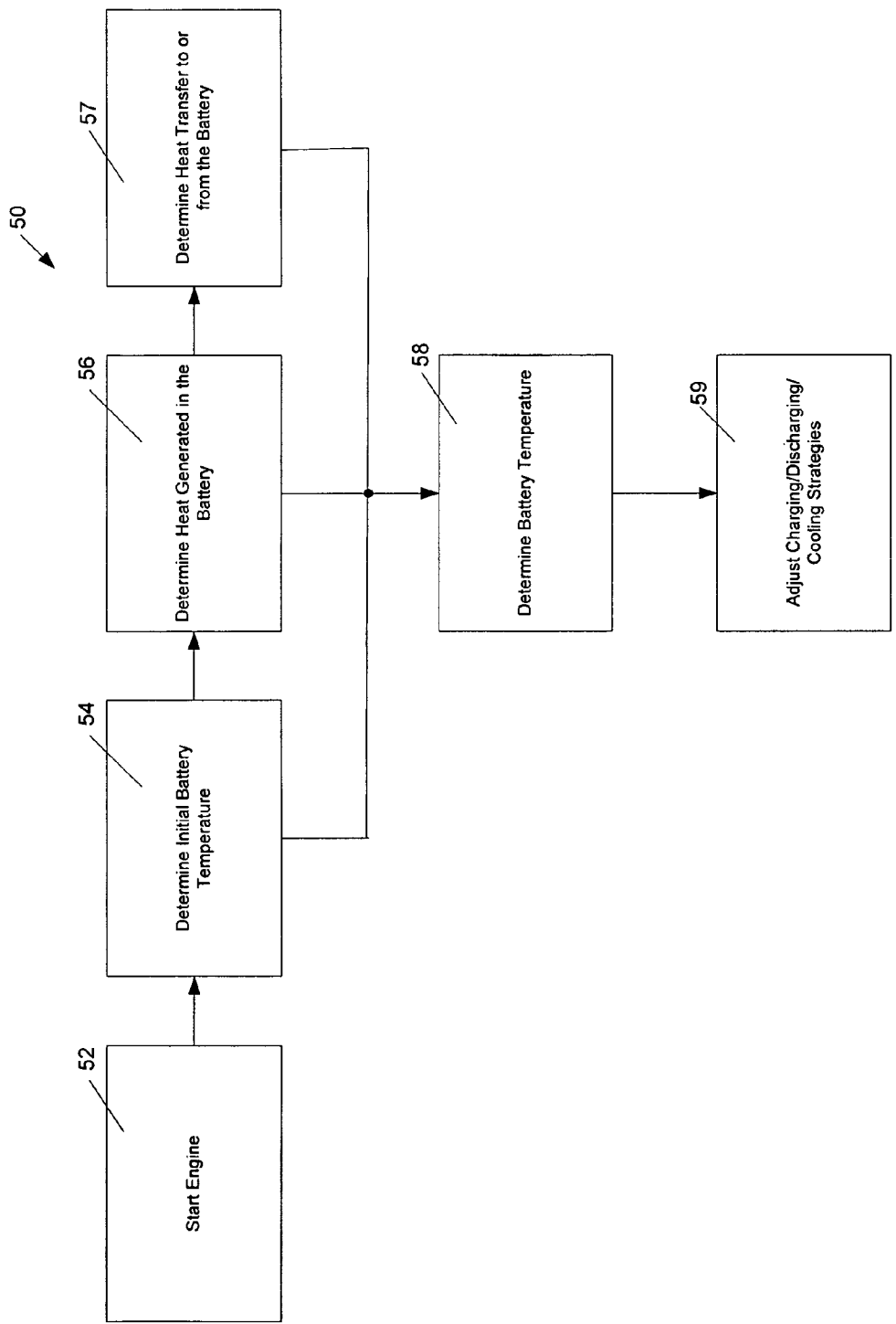
FIG. 2 is a flow chart illustrating an exemplary disclosed method for approximating the temperature of a battery.

FIG. 2 illustrates the general process 50 for approximating the temperature of the battery 14. Details of this process will be explained in connection with FIGS. 3, 4A, 4B, and 5. The process 50 initiates upon the startup of the engine 12 at step 52. At step 54, an initial temperature of the battery 14 is determined. At step 56, the heat generated inside the battery 14 is approximated. At step 57, the heat transferred to and from the battery 14 is approximated. At step 58, the battery temperature is approximated based on the initial battery temperature (step 54), the heat generated in the battery 14 (step 56), and the heat transferred to and from the battery 14 (step 57). At step 59, the charging, discharging and cooling strategies can be adjusted according to the approximated battery temperature (step 58).

Figure 3:
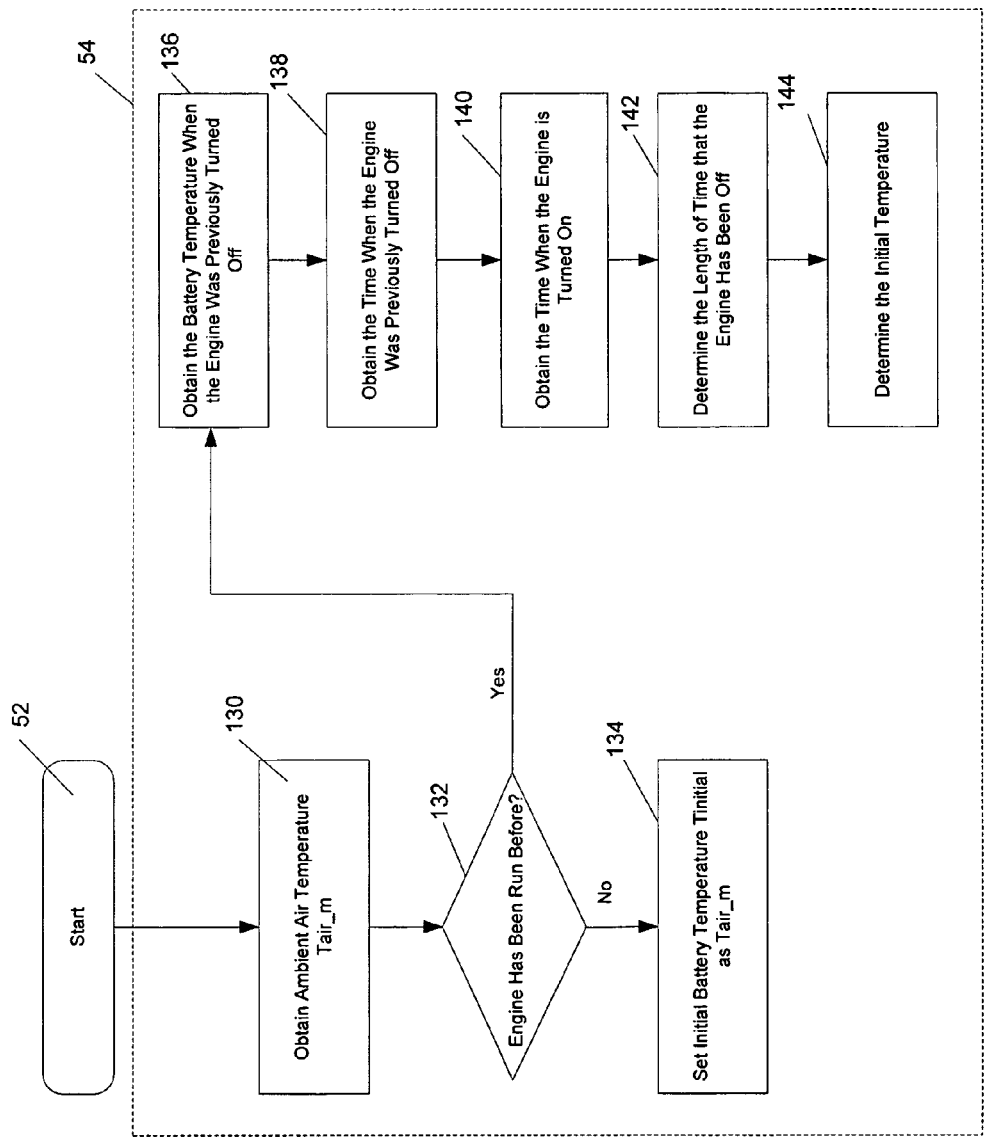
FIG. 3 is a flow chart illustrating an exemplary disclosed method for approximating an initial temperature of the battery.

FIG. 3 illustrates an exemplary embodiment of how to determine the initial temperature of the battery 14. As shown in FIG. 3, the ambient air temperature is obtained from the ambient air temperature sensor 22 at step 130. Step 132 checks whether the engine system 10 has been run before. If the engine system 10 has never run before, the initial temperature of the battery 14 is set to be the ambient air temperature at step 134. If the engine system 10 has been run before, the battery temperature at the time when the engine system 10 was previously turned off may be obtained from the memory 30 at step 136. The time when the engine system 10 was previously turned off is obtained from the memory 30 at step 138, and the time when the engine system 10 was/is turned on is obtained from the memory 30 at step 140. Using these times, the length of time that the engine system 10 has been off can be calculated at step 142. The initial temperature of the battery 14 is approximated at step 144 based on the battery temperature at the time when the engine system 10 was previously turned off, the length of time that the engine system 10 has been off before the engine is turned on in the current operation, and the ambient air temperature. For example, the difference between the ambient air temperature and the battery temperature at the time when the engine system was previously turned off can be calculated, and using that difference and the length of time that the engine has been off, the heat transferred between the battery 14 and the environment can be approximated. The initial battery temperature can be approximated by adding the temperature change caused by the heat transfer to the battery temperature at the time when the engine system was previously turned off.

In one embodiment, if the engine system 10 has been continuously in an operation, a battery temperature determined at a previous time in the operation and stored in the memory 30 may be used as the initial battery temperature to determine the battery temperature at a later time.

Figure 4A:
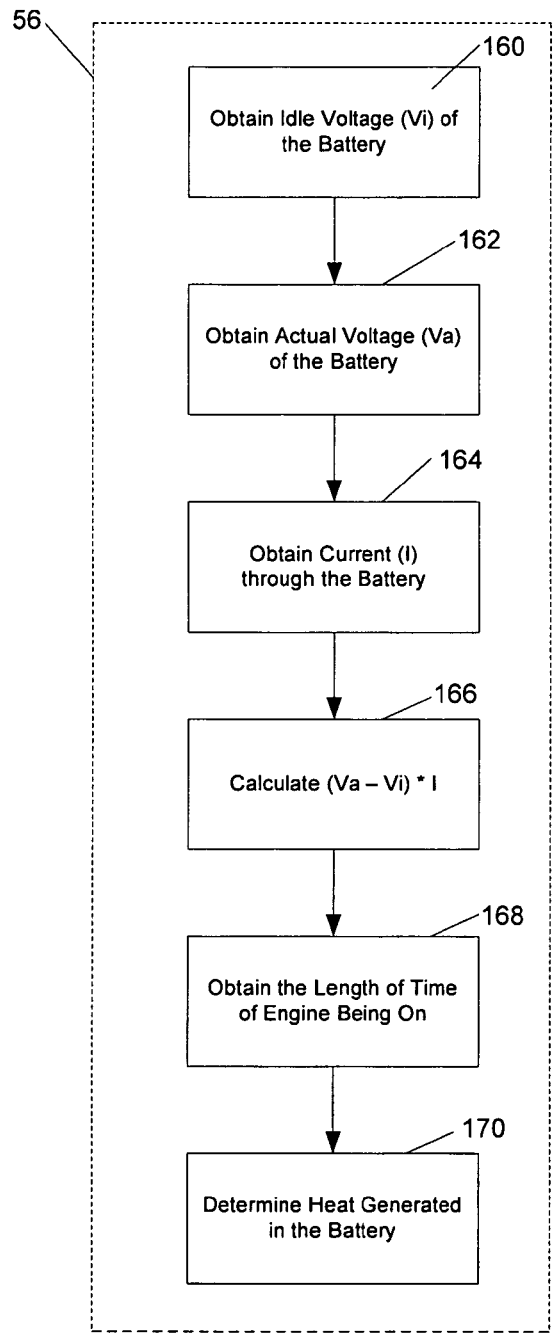
FIG. 4A is a flow chart illustrating an exemplary disclosed method for approximating the heat generated in a battery according to one embodiment.
Figure 4B:
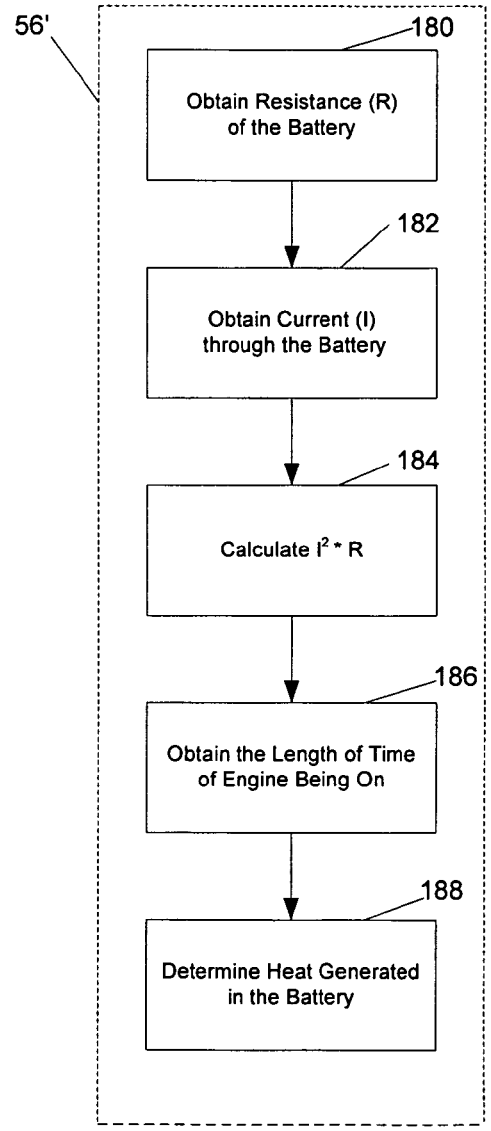
FIG. 4B is a flow chart illustrating an exemplary disclosed method for approximating the heat generated in a battery according to another embodiment.

Referring again to FIG. 2, at step 56, the heat generated inside the battery 14 is determined. FIG. 4A illustrates one exemplary embodiment and FIG. 4B illustrates another exemplary embodiment of how to determine the heat generated inside the battery 14. As shown in FIG. 4A, the heat generated inside the battery 14 may be calculated based on the voltage of the battery 14 and the current flowing through the battery 14. In FIG. 4A, at step 160, an open circuit voltage (Vi) of the battery 14 is measured by the voltage sensor 24 when the battery 14 is not being charged or discharged. The open circuit voltage Vi may also be measured at the beginning of charging or discharging the battery 14. At step 162, an actual voltage (Va) of the battery 14 is measured by the voltage sensor 24 when the battery 14 is in normal operation. The current (I) flowing through the battery 14 is measured by the current sensor 26 at step 164. The actual voltage of the battery is compared with the open circuit voltage, and then the voltage difference (absolute value of (Vi-Va)) is multiplied by the current (I) at step 166. The time when the current charge or discharge strategy was engaged or when the last measurement period ended, whichever is later, is obtained from the memory 30. The current time is obtained from the clock 40. Using these times, the length of time that the battery has been charged or discharged under the current measurement period (the time span of current temperature measurement) can be calculated at step 168. At step 170, the heat generated in the battery 14 can be approximated by multiplying the result calculated at step 166 and the length of time calculated at step 168.

FIG. 4B shows another embodiment (denoted by reference number 56') for determining the heat generated in the battery 14. As shown in FIG. 4B, the heat generated inside the battery 14 may be calculated based on the resistance of the battery and the current flow through the battery. The resistance (R) of the battery at an approximated temperature is obtained from resistance corresponding to temperature profile data stored in the memory 30 at step 180. The data of the resistance of the battery 14 corresponding to the temperature of the battery 14 may be stored in a look-up table or a graph of resistance versus temperature obtained from lab experiments or data sheets. With knowledge of the initial battery temperature (approximated at step 54 in FIG. 2), the resistance (R) at the initial battery temperature can be obtained from the memory 30. The current (I) flowing through the battery 14 can be measured by the current sensor 26 at step 182. At step 184, the current is squared and the squared current is multiplied by the resistance obtained at step 180. The time when the current charge or discharge strategy was engaged or when the last measurement period ended, whichever is later, is obtained from the memory 30. The current time is obtained from the clock 40. Using these times, the length of time that the battery has been charged or discharged under the current measurement period (the time span of current temperature measurement) can be calculated at step 186. At step 188, the heat generated inside the battery 14 over time can be approximated by multiplying the result calculated at step 184 and the length of time calculated at step 186.

The battery temperature may also be affected by heat transfer between the battery 14 and the environment including the ambient air and other surrounding devices around the battery 14. Referring to FIG. 2, the heat transfer between the battery and the environment is determined at step 57.

Figure 5:
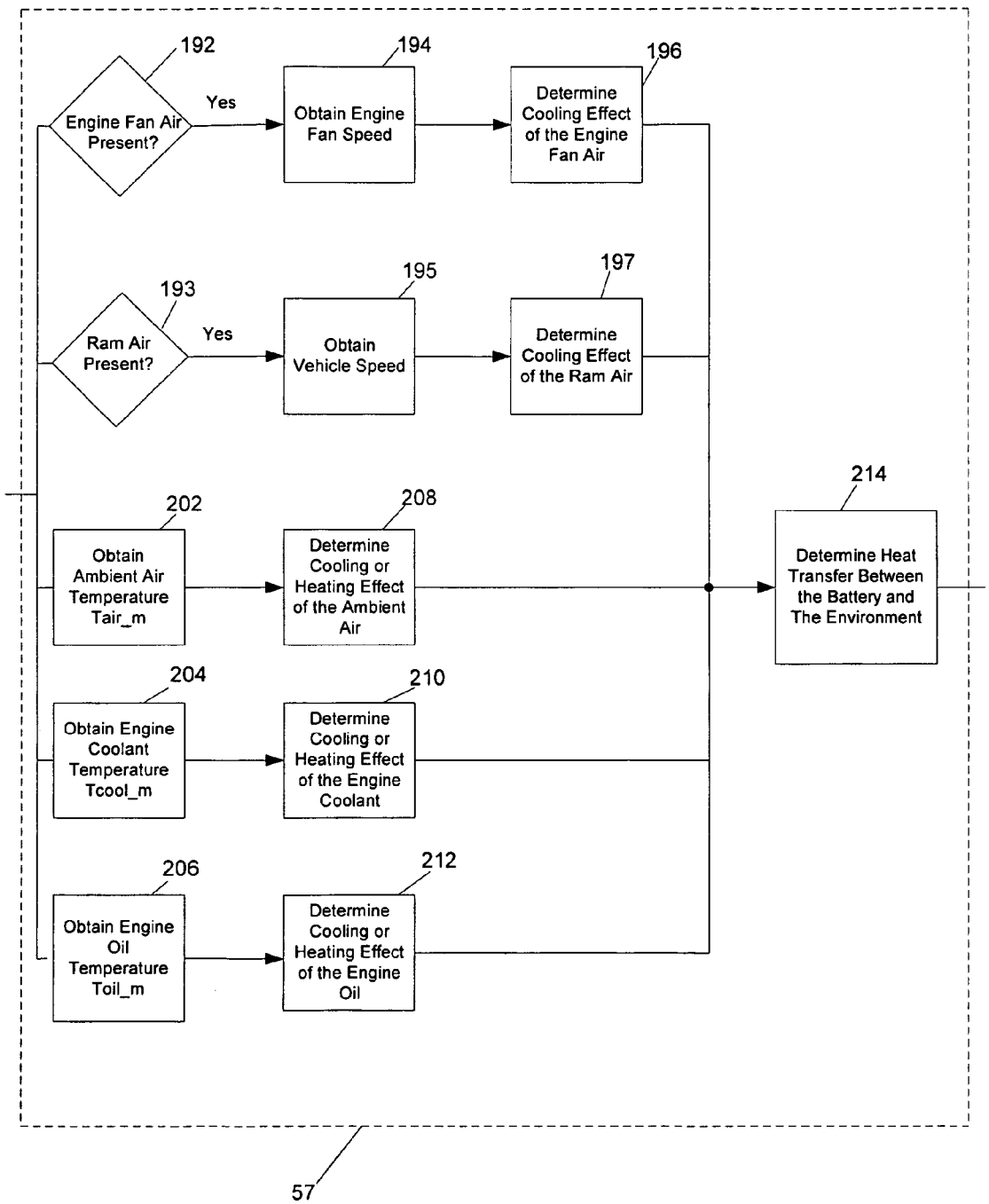
FIG. 5 is a flow chart illustrating an exemplary disclosed method for approximating the heat transfer between a battery and the environment according to one embodiment.

According to one embodiment, as shown in FIG. 5, the heat transfer between the battery 14 and the environment is determined based on the heating or cooling effect of the engine (characterized by the engine coolant and engine oil), the ambient air, the cooling fan, the ram air, etc. At step 192, it is determined whether cooling fan airflow is present. If cooling fan airflow is present, the cooling fan speed is obtained from the cooling fan speed sensor 38 at step 194. At step 196, the cooling effect $T_{fancool}$ of the cooling fan airflow on the battery 14 (e.g., heat transferred out of the battery caused by the cooling fan airflow) is determined based on the cooling fan speed. For example, the cooling effect $T_{fancool}$ can be approximated by multiplying the initial temperature of the battery 14 with a cooling effect factor, which is determined based on the cooling fan speed, and a span of time that the cooling fan has been on. The relationship between the cooling effect factor and the cooling fan speed may be predetermined by lab experiments. The cooling fan may be a battery cooling fan, an engine cooling fan, or any fan that may produce airflow over the battery. At step 193, it is determined whether ram airflow (caused by the running vehicle) is present. If ram airflow is present, the vehicle speed is obtained from the vehicle speed sensor 36 at step 195. At step 197, the cooling effect $T_{ramcool}$ of the ram air on the battery 14 is determined based on the vehicle speed. The method of determining the cooling effect of the ram airflow can be similar to the method of determining the cooling effect of the cooling fan airflow. In one embodiment, the steps 192 and 193 of determining whether the cooling fan airflow or the ram airflow is present can be skipped and the obtained cooling fan speed and vehicle speed values can be used to determine whether the cooling fan airflow or the ram airflow is present and the cooling effects of each, if they exist. For example, if the cooling fan speed or the vehicle speed is zero, no cooling effect of the cooling fan airflow or the ram airflow needs to be considered. At step 202 in FIG. 5, the ambient air temperature $T_{air\_m}$ is obtained from the ambient air temperature sensor 22. At step 208, the heating or cooling effect of the ambient air on the battery 14, or, in other words, the heating or cooling effect $T_{aircool}$ caused by the heat transfer between the battery 14 and the ambient air, is obtained by multiplying the difference $\Delta T_{air}$ between $T_{air\_m}$ and a previously determined battery temperature (e.g., the initial battery temperature) stored in the memory with a lab determined factor $f_{air}$, $T_{aircool}=\Delta T_{air}*f_{air}$. The engine coolant temperature $T_{cool\_m}$ is obtained from the engine coolant temperature sensor 32 at step 204. At step 210, the heating or cooling effect of the engine, characterized by the engine coolant temperature $T_{coolant}$, on the battery 14 is obtained by multiplying the difference $\Delta T_{coolant}$ between $T_{coolant\_m}$ and the previously determined battery temperature stored in the memory with a lab determined factor $f_{coolant}$, $T_{coolant}=\Delta T_{coolant}*f_{coolant}$. The heating or cooling effect of the engine, characterized by the engine oil temperature $T_{oil\_m}$, is obtained from the engine oil temperature sensor 34 at step 206. The heating or cooling effect of the engine oil on the battery 14 is determined by multiplying the difference $\Delta T_{oil}$ between $T_{oil\_m}$ and the previously determined battery temperature stored in the memory with a lab determined factor $f_{oil}$, Toil=$\Delta T_{oil}*f_{oil}$, at step 212. At step 214, the total heating or cooling effect on the battery caused by the heat transfer between the battery and the environment $T_{trans}$ is approximated by adding $T_{fancool}$, $T_{ramcool}$, $T_{aircool}$, $T_{coolant}$, and $T_{oil}$ ($T_{trans}=T_{fancool}+T_{ramcool}+T_{aircool}+T_{coolant}+T_{oil}$). It is important to note that all of the factors mentioned above will change between applications. For example, if the battery or batteries are located in the engine compartment, the coolant and oil temperature factors may contain higher weight than they otherwise would if the batteries were located external to the engine cabinet. The factors will be chosen to eliminate any cumulative errors that may develop by estimating based on previous estimations.

Referring again to FIG. 2, at step 58, the controller 18 determines the battery temperature based on the initial temperature of the battery 14, the heat generated in the battery 14, and the heat transfer between the battery 14 and the environment. For example, the total heat stored in the battery 14, which is the sum of the heat generated in the battery and the heat transferred between the battery and the environment, can be calculated. The temperature increase (or decrease) can be calculated based on the total heat stored in the battery. In one embodiment, the battery temperature increase can be calculated by dividing the total heat stored in the battery by the heat capacity of the battery, which is predetermined by laboratory experiments. In another embodiment, a battery temperature increase corresponding to a total heat stored in the battery can be measured in laboratory experiments and a database can be created based on such measurements and stored in the memory. When the battery 14 is in an operation, the battery temperature increase corresponding to the value of the calculated total heat stored in the battery can be obtained from the database. The battery temperature is the sum of the initial temperature of the battery 14 and the battery temperature increase calculated based on the value of the total heat.

At step 59, the battery temperature is used to adjust the charging/discharging/cooling strategies of the battery 14. For example, in a charging process, if the battery temperature is higher than a predetermined value, the charging voltage of the battery can be reduced to prevent overheating the battery. For another example, in a charging process when the battery temperature is low, with the chemical reactions inside the battery slowing down and the charge stored in the battery with minimal leakage, even a small amount of charging current may overcharge the battery. With knowledge of the battery temperature and voltage of the battery, a strategy to limit the amount of charging current and therefore prevent overcharging can be provided. If the operation of the engine system 10 is finished and the engine 12 is shut down, the battery temperature can be stored in the memory 30 for determining a subsequent battery temperature in a future operation of the engine system 10. The engine shutdown time also can be stored in the memory 30 for use in the future operation.

Several advantages over the prior art may be associated with the disclosed system and method for determining a battery temperature. The disclosed system can determine the battery temperature without installing any additional battery temperature sensors. The disclosed system may provide a more accurate battery temperature estimation, because it not only measures mechanical attributes of an engine, but also measures the electrical factors to calculate the heat generated in the battery due to the chemical reactions that take place inside the battery during charging or discharging the battery. With the knowledge of an accurate battery temperature, the battery can be charged in an optimal manner, and overcharging of the battery can be prevented. Additionally, overheating control strategies can be implemented that utilize the battery temperature to control charge or discharge rates, and cooling strategy can be provided to keep the battery cool during high temperatures. Therefore, the life of the battery can be extended, and the vehicle or work machine can work with a better and more reliable power supply.

It will be apparent to those skilled in the art that various modifications and variations can be made to the system and method for determining battery temperature. Other embodiments will be apparent to those skilled in the art from consideration of the specification and practice of the disclosed system for determining a temperature of a battery in a current operation. It is intended that the specification and examples be considered as exemplary only, with a true scope being indicated by the following claims and their equivalents.

What is claimed is:

1. A system for approximating a temperature of a battery, said system comprising:
    a sensor configured to provide a temperature measurement of the ambient air;
    a sensor configured to provide a voltage measurement of the battery;
    a sensor configured to provide a current measurement of the battery; and
    signal processing circuitry configured to determine an approximate battery temperature as a function of the measured ambient air temperature, the measured voltage of the battery, and the measured current through the battery.

2. A system according to claim 1, further including:
    a sensor configured to provide a temperature measurement of an engine coolant, wherein the signal processing circuitry is further responsive to the sensor providing the temperature measurement of the engine coolant to calculate the approximation of the temperature of the battery.

3. A system according to claim 1, further including:
    a sensor configured to provide a temperature measurement of an engine oil wherein the signal processing circuitry is further responsive to the sensor providing the temperature measurement of the engine oil to calculate the approximation of the temperature of the battery.

4. A system according to claim 1, further including:
    a sensor configured to provide a speed measurement of a cooling fan providing airflow over the battery, wherein the signal processing circuitry is further responsive to the sensor providing the speed measurement of the cooling fan to calculate the approximation of the temperature of the battery.

5. A system according to claim 1, further including:
    a sensor configured to provide a speed measurement of a vehicle where the battery is installed, wherein the signal processing circuitry is further responsive to the sensor providing the speed measurement of the vehicle to calculate the approximation of the temperature of the battery.

6. A system according to claim 1, wherein the signal processing circuitry includes a memory configured to store the approximation of the temperature of the battery.

7. A system according to claim 1, wherein the signal processing circuitry includes a memory configured to store times of events of the battery.

8. A system according to claim 1, wherein the signal processing circuitry is further configured to determine a length of time that the battery has been charged or discharged, and responsive to the length of time to approximate the temperature of the battery.

9. A system for approximating a temperature of a battery, the system comprising:
    a sensor configured to provide a temperature measurement of the ambient air;
    a sensor configured to provide a current measurement of the battery; and
    signal processing circuitry responsive to the sensors, the signal processing circuitry including a memory configured to store data of resistance of the battery corresponding to temperature of the battery, the signal processing circuitry being configured to calculate an initial temperature of the battery at least partially based on the measured ambient air temperature, to calculate a heat generated inside the battery based on the resistance and measured current through the battery, and to calculate the approximation of the temperature of the battery based on the calculated values for the initial battery temperature and the heat generated inside the battery.

10. A system according to claim 9, wherein the signal processing circuitry is configured to calculate the heat generated inside the battery based on the resistance of the battery at the initial temperature and the current through the battery.

11. A system according to claim 9, further including:
    a sensor configured to provide a temperature measurement of an engine coolant, wherein the signal processing circuitry is further responsive to the sensor providing the temperature measurement of the engine coolant to calculate the approximation of the temperature of the battery.

12. A system according to claim 9, further including:
    a sensor configured to provide a temperature measurement of an engine oil wherein the signal processing circuitry is further responsive to the sensor providing the temperature measurement of the engine oil to calculate the approximation of the temperature of the battery.

13. A system according to claim 9, further including:
a sensor configured to provide a speed measurement of a cooling fan adapted to provide airflow to the battery, wherein the signal processing circuitry is further responsive to the sensor providing the speed measurement of the cooling fan to calculate the approximation of the temperature of the battery.

14. A system according to claim 9, further including:
a sensor configured to provide a speed measurement of a vehicle where the battery is installed, wherein the signal processing circuitry is further responsive to the sensor providing the speed measurement of the vehicle to calculate the approximation of the temperature of the battery.

15. A system according to claim 9, wherein the memory is configured to store the approximation of the temperature of the battery.

16. A system according to claim 9, wherein the signal processing circuitry includes a memory configured to store times of events of the battery.

17. A system according to claim 9, wherein the signal processing circuitry is further configured to determine a length of time that the battery has been charged or discharged, and responsive to the length of time to approximate the temperature of the battery.

18. A method of approximating a temperature of a battery in a system in an operation, said method comprising:
approximating an initial temperature of the battery;
approximating heat generated inside the battery using at least one of obtaining an open circuit voltage of the battery, measuring an actual voltage of the battery, measuring a current through the battery, or obtaining a resistance of the battery; and
approximating the temperature of the battery at least partially based on the approximated initial temperature of the battery and the approximated heat generated inside the battery.

19. The method of claim 18, wherein approximating the heat generated inside the battery includes:
obtaining the open circuit voltage of the battery;
measuring the actual voltage of the battery;
measuring the current through the battery; and
approximating the heat generated inside the battery based on the current and the voltage difference between the actual voltage and the open circuit voltage.

20. The method of claim 18, wherein approximating the heat generated inside the battery includes:
obtaining the resistance of the battery;
measuring the current through the battery; and
approximating the heat generated inside the battery based on the resistance of and the current through the battery.

21. The method of claim 20, wherein obtaining the resistance of the battery includes obtaining the resistance of the battery from a memory, which stores resistance data of the battery corresponding to the temperature of the battery.

22. The method of claim 18, wherein approximating the initial temperature of the battery includes setting the initial temperature of the battery as an ambient air temperature.

23. The method of claim 18, wherein approximating the initial temperature of the battery includes:
measuring an ambient air temperature in an initial state;
obtaining the temperature of the battery when the system was previously turned off;
calculating the length of time from the time when the system was previously turned off to the time when the system is initially turned on; and
approximating the initial temperature of the battery based on the ambient air temperature in the initial state, the temperature of the battery when the system was previously turned off, and the length of time from the time when the system was previously turned off to the time when the system is initially turned on.

24. The method of claim 23, wherein obtaining the temperature of the battery when the system was previously turned off includes obtaining the temperature of the battery when the system was previously turned off from a memory in the system.

25. The method of claim 23, wherein calculating the length of time from the time when the system was previously turned off to the time when the system is initially turned on includes:
obtaining a time when the system was previously turned off;
obtaining a time when the system is initially turned on; and
calculating the length of time based on the time when the system was previously turned off and the time when the system is initially turned on.

26. The method of claim 18 further including:
approximating heat transfer that affects the temperature of the battery, wherein approximating the temperature of the battery further based on the heat transfer that affects the temperature of the battery.

27. The method of claim 26, wherein approximating heat transfer that affects the temperature of the battery includes:
measuring an ambient air temperature;
measuring an engine coolant temperature in the system;
measuring an engine oil temperature in the system; and
approximating the heat transfer based on the ambient air temperature, the engine coolant temperature in the system, and the engine oil temperature in the system.

28. The method of claim 26, wherein approximating heat transfer that affects the temperature of the battery further includes:
measuring the speed of a cooling fan adapted to provide airflow to the battery; and
approximating the heat transfer at least in part based on the speed of the cooling fan.

29. The method of claim 26, wherein approximating heat transfer that affects the temperature of the battery further includes:
measuring the speed of a vehicle where the system is installed; and
approximating the heat transfer at least in part based on the vehicle speed.

30. A method of charging a battery comprising:
approximating the temperature of the battery according to claim 14; and
if the temperature of the battery is higher than a predetermined value, reducing a charging voltage of the battery.

31. A method of charging a battery comprising:
approximating the temperature of the battery according to claim 14; and
if the temperature of the battery is lower than a predetermined value, reducing a charging voltage of the battery.

32. A method of discharging a battery including:
approximating the temperature of the battery according to claim 14; and
if the temperature of the battery is higher than a predetermined value, reducing a discharging current through the battery.

33. An engine system comprising:
an engine;
a battery coupled to the engine;
a battery charging system coupled to the battery;

a controller coupled to the engine and the battery charging system;

a sensor configured to provide a temperature measurement of the ambient air;

a sensor configured to provide a voltage measurement of the battery; and a sensor configured to provide a current measurement of the battery, wherein the controller is responsive to the sensors and configured to calculate an approximate temperature of the battery, and configured to control the battery charging system based on the approximate temperature of the battery.

34. An engine system according to claim 33, wherein the controller is configured to approximate an initial temperature of the battery at least partially based on the ambient air temperature, to approximate heat generated inside the battery based on the voltage of and current through the battery, and to calculate the battery temperature based on the initial battery temperature and the heat generated inside the battery.

35. An engine system comprising:

an engine;

a battery coupled to the engine;

a battery charging system coupled to the battery;

a controller coupled to the engine and the battery charging system, the controller including a memory for storing data of resistance of the battery corresponding to temperature of the battery;

a sensor configured to provide a temperature measurement of the ambient air; and a sensor configured to provide a current measurement of the battery, wherein the controller is responsive to the sensors and configured to calculate an approximate temperature of the battery, and configured to control the battery charging system based on the temperature of the battery.

36. An engine system according to claim 35, wherein the controller is configured to approximate an initial temperature of the battery at least partially based on the ambient air temperature, to approximate heat generated inside the battery based on the resistance of and current through the battery, and to calculate the approximate temperature of the battery based on the initial battery temperature and the heat generated inside the battery.

* * * * *